(12) United States Patent
Jiang et al.

(10) Patent No.: US 11,201,564 B2
(45) Date of Patent: Dec. 14, 2021

(54) MULTI-LEVEL INVERTER INCLUDING AT LEAST FOUR SWITCHES AND AT LEAST FOUR RESISTORS

(71) Applicant: HUAWEI TECHNOLOGIES CO., LTD., Guangdong (CN)

(72) Inventors: Yiming Jiang, Shenzhen (CN); Jincheng Shao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/068,127

(22) Filed: Oct. 12, 2020

(65) Prior Publication Data
US 2021/0028722 A1    Jan. 28, 2021

Related U.S. Application Data

(63) Continuation of application No. PCT/CN2019/083514, filed on Apr. 19, 2019.

(30) Foreign Application Priority Data

May 3, 2018    (CN) .......................... 201810416766.6

(51) Int. Cl.
*H02M 7/483*    (2007.01)
*H02M 7/487*    (2007.01)
(Continued)

(52) U.S. Cl.
CPC .............. *H02M 7/483* (2013.01); *H02M 1/36* (2013.01); *H02M 7/487* (2013.01);
(Continued)

(58) Field of Classification Search
CPC ...... H02M 1/36; H02M 7/483; H02M 7/4837; H02M 7/487; H02M 7/53871; H02M 7/4835
See application file for complete search history.

(56) References Cited

U.S. PATENT DOCUMENTS 3,569,812 A * 3/1971 Bates .................... B60S 1/0807
                                                318/443
4,203,151 A * 5/1980 Baker .................... H02M 7/501
                                                363/43
(Continued)

FOREIGN PATENT DOCUMENTS

CN    101719727 A    6/2010
CN    103095168 A    5/2013
(Continued)

*Primary Examiner* — Yusef A Ahmed
(74) *Attorney, Agent, or Firm* — Womble Bond Dickinson (US) LLP (57) ABSTRACT

Embodiments of the present disclosure disclose a multi-level inverter, which belongs to the field of power electronics. The multi-level inverter includes a main topology, at least four resistors, a switch, and a controller. The main topology includes a power supply, a flying capacitor, and at least four semiconductor switches. The flying capacitor is electrically connected to the power supply. The controller is configured to: before the main topology works, control the switch to be closed, and when detecting that charging the flying capacitor is completed, control the switch to be open. The multi-level inverter provided in the present disclosure can prevent a semiconductor switch from being damaged.

10 Claims, 8 Drawing Sheets

(51) Int. Cl.
   *H02M 7/5387* (2007.01)
   *H02M 1/36* (2007.01)
(52) U.S. Cl.
   CPC ..... *H02M 7/4837* (2021.05); *H02M 7/53871* (2013.01); *H02M 7/4835* (2021.05)

(56) References Cited

U.S. PATENT DOCUMENTS

| | | | | |
|---|---|---|---|---|
| 8,503,203 | B1* | 8/2013 | Szczeszynski | H02M 1/36 363/60 |
| 9,083,230 | B2* | 7/2015 | Narimani | H02M 7/483 |
| 10,027,223 | B1* | 7/2018 | Zhang | H02M 3/07 |
| 10,153,685 | B2* | 12/2018 | Yoscovich | H02M 7/4833 |
| 2005/0180236 | A1* | 8/2005 | Thiele | H02M 1/36 365/203 |
| 2009/0289639 | A1* | 11/2009 | Kawamura | G01R 31/086 324/658 |
| 2009/0295398 | A1* | 12/2009 | Ohnuki | H01M 10/48 324/429 |
| 2009/0316323 | A1* | 12/2009 | Knopf | H01H 47/226 361/156 |
| 2011/0006726 | A1* | 1/2011 | Dittmer | B60L 3/0046 320/101 |
| 2011/0006781 | A1* | 1/2011 | Kawamura | G01R 31/52 324/551 |
| 2013/0057294 | A1* | 3/2013 | Mizoguchi | G01R 1/00 324/434 |
| 2013/0272045 | A1* | 10/2013 | Soeiro | H02M 7/487 363/131 |
| 2014/0300413 | A1* | 10/2014 | Hoyerby | H03F 3/2173 330/251 |
| 2017/0012554 | A1 | 1/2017 | Pu et al. | |
| 2017/0047863 | A1* | 2/2017 | Kidera | H02M 1/12 |
| 2017/0160334 | A1* | 6/2017 | Kawanaka | B60L 58/15 |
| 2017/0299658 | A1* | 10/2017 | Kozuka | G01R 31/3835 |
| 2018/0006559 | A1 | 1/2018 | Chen et al. | |
| 2018/0159362 | A1* | 6/2018 | Liu | H01M 10/4264 |
| 2018/0219492 | A1* | 8/2018 | Shi | H02M 7/483 |
| 2019/0195931 | A1* | 6/2019 | Kawamura | B60L 3/0069 |
| 2020/0076302 | A1* | 3/2020 | Zhuang | H02M 1/36 |
| 2021/0057999 | A1* | 2/2021 | Prodic | H02M 3/33569 |
| 2021/0135567 | A1* | 5/2021 | Zhang | H02M 3/07 |

FOREIGN PATENT DOCUMENTS

| | | |
|---|---|---|
| CN | 104539182 A | 4/2015 |
| CN | 105453406 A | 3/2016 |
| CN | 105811795 A | 7/2016 |
| CN | 106059353 A | 10/2016 |
| CN | 106329974 A | 1/2017 |
| CN | 107070277 A | 8/2017 |
| CN | 108667327 A | 10/2018 |
| GN | 202172367 U | 3/2012 |
| GN | 202261005 U | 5/2012 |
| WO | 2017054680 A1 | 4/2017 |

* cited by examiner

MULTI-LEVEL INVERTER INCLUDING AT LEAST FOUR SWITCHES AND AT LEAST FOUR RESISTORS

CROSS-REFERENCE TO RELATED APPLICATIONS

This application is a continuation of International Application No. PCT/CN2019/083514, filed on Apr. 19, 2019, which claims priority to Chinese Patent Application No. 201810416766.6, filed on May 3, 2018. The disclosures of the aforementioned applications are hereby incorporated by reference in their entireties.

TECHNICAL FIELD

This application relates to the field of power electronics, and in particular, to a multi-level inverter.

BACKGROUND

With development of power electronics technologies, the power electronics technologies are widely applied in a new energy system, a power system, a power system, and the like. In the power electronics technologies, a most commonly used technology is to convert a direct current into an alternating current and output a plurality of level states by using a multi-level inverter. For the multi-level inverter, a flying-capacitor-clamped multi-level inverter is a typical multi-level inverter.

In a related art, the flying-capacitor-clamped multi-level inverter includes a power supply, at least one flying capacitor, and at least one semiconductor switch. Usually, the flying capacitor is connected to at least one semiconductor switch in parallel, and after being connected to the at least one semiconductor switch in parallel, is connected to at least one semiconductor switch in series.

When the flying-capacitor-clamped multi-level inverter just starts to work, a voltage of the flying capacitor is particularly low when charging the flying capacitor just begins. Because a voltage of the semiconductor switch that is connected to the flying capacitor in parallel is the same as the voltage of the flying capacitor, the voltage of the semiconductor switch that is connected to the flying capacitor in parallel is also comparatively low. In this case, a voltage of the power supply is all applied to the semiconductor switch connected in series. As a result, a voltage of the semiconductor switch connected in series is excessively high, resulting in that the semiconductor switch connected in series is damaged.

SUMMARY

To resolve a problem that a switch is damaged, embodiments of the present disclosure provide a multi-level inverter. The technical solutions are as follows.

According to a first aspect, a multi-level inverter is provided. The multi-level inverter includes a main topology, at least four resistors, a switch, and a controller, and the main topology includes a power supply, at least one flying capacitor, and at least four semiconductor switches; a first end of the flying capacitor is electrically connected to a positive electrode of the power supply, a second end of the flying capacitor is electrically connected to a negative electrode of the power supply, the controller is electrically connected to the switch, the controller is electrically connected to the main topology, the flying capacitor is connected to at least two semiconductor switches in parallel, at least one semiconductor switch is disposed on a first connection line between the first end of the flying capacitor and the positive electrode of the power supply, and at least one semiconductor switch is disposed on a first connection line between the second end of the flying capacitor and the negative electrode of the power supply; the switch and at least one resistor are disposed on a second connection line between the first end of the flying capacitor and the positive electrode of the power supply; the switch and at least one resistor are disposed on a connection line between the first end of the flying capacitor and the negative electrode of the power supply; the switch and at least one resistor are disposed on a connection line between the second end of the flying capacitor and the positive electrode of the power supply; the switch and at least one resistor are disposed on a second connection line between the second end of the flying capacitor and the negative electrode of the power supply; and the controller is configured to: before the main topology works, control the switch to be closed, and when detecting that charging the flying capacitor is completed, control the switch to be open.

In the solution shown in this embodiment of the present disclosure, the multi-level inverter includes the main topology, the at least four resistors, the switch, and the controller, the main topology includes the power supply, the at least one flying capacitor, and the at least four semiconductor switches, and the main topology is configured to convert a direct current into an alternating current and output a plurality of level states. The flying capacitor includes the first end and the second end. The first end may be an upper plate of the flying capacitor, and the second end may be a lower plate of the flying capacitor, or the first end may be the other end of a conducting wire connected to an upper plate of the flying capacitor, and the second end may be the other end of a conducting wire connected to a lower plate of the flying capacitor. The first end of the flying capacitor may be electrically connected to the positive electrode of the power supply by using a conducting wire, and there are two connection lines between the first end of the flying capacitor and the positive electrode of the power supply. The second end of the flying capacitor may be electrically connected to the negative electrode of the power supply by using a conducting wire, and there are two connection lines between the second end of the flying capacitor and the negative electrode of the power supply. The controller may be electrically connected to the switch, and is configured to control the switch to be closed, open, or the like. The flying capacitor is connected to at least two semiconductor switches in parallel, at least one semiconductor switch is disposed on the first connection line between the first end of the flying capacitor and the positive electrode of the power supply, and at least one semiconductor switch is disposed on the first connection line between the second end of the flying capacitor and the negative electrode of the power supply. The switch and at least one resistor may be disposed on the second connection line between the first end of the flying capacitor and the positive electrode of the power supply. The switch and at least one resistor may be disposed on the connection line between the first end of the flying capacitor and the negative electrode of the power supply. The switch and at least one resistor may be disposed on the connection line between the second end of the flying capacitor and the positive electrode of the power supply. The switch and at least one resistor may be disposed on the second connection line between the second end of the flying capacitor and the negative electrode of the power supply. In this way, by controlling resistance values of the at least four resistors, a voltage of the flying capacitor can be controlled, in other words, a voltage of the flying capacitor can be controlled at a time at which charging the flying capacitor is completed. Before the main topology starts to work, the controller may control the switch to be closed. In this case, the power supply starts to charge the flying capacitor. The controller may detect whether charging the flying capacitor is completed. If detecting that charging the flying capacitor is completed, the controller may control the switch to be open. In this way, when the multi-level inverter just starts to work, there is a voltage at two ends of the flying capacitor, and there is also a voltage at two ends of the switches that are connected to the flying capacitor in parallel. Therefore, it does not result in that a voltage of the power supply is all applied to the switches connected in series.

In an embodiment, the controller is electrically connected to the first end of the flying capacitor and the second end of the flying capacitor separately, and the controller is configured to: when detecting that a voltage of the flying capacitor is a preset value, control the switch to be open.

In the solution shown in this embodiment of the present disclosure, the controller is electrically connected to the first end of the flying capacitor, and the controller is electrically connected to the second end of the flying capacitor. The controller may detect a voltage at the first end of the flying capacitor, detect a voltage at the second end of the flying capacitor, and then obtain a difference between the voltage at the first end and the voltage at the second end. The obtained value is the voltage of the flying capacitor. When the controller determines that the voltage of the flying capacitor is equal to the preset value, the controller may determine that charging the flying capacitor is completed, and may control the switch to be open.

In one embodiment, the controller is electrically connected to the main topology, and after controlling the switch to be open, the controller is further configured to control the main topology to output at least one level state.

In one embodiment, the at least four resistors are a first resistor, a second resistor, a third resistor, and a fourth resistor; the first resistor is disposed on the second connection line between the first end of the flying capacitor and the positive electrode of the power supply; the fourth resistor is disposed on the connection line between the first end of the flying capacitor and the negative electrode of the power supply; the second resistor is disposed on the connection line between the second end of the flying capacitor and the positive electrode of the power supply; and the third resistor is disposed on the second connection line between the second end of the flying capacitor and the negative electrode of the power supply.

In the solution shown in this embodiment of the present disclosure, the at least four resistors are the first resistor, the second resistor, the third resistor, and the fourth resistor; the first resistor may be disposed on the second connection line between the first end of the flying capacitor and the positive electrode of the power supply; the fourth resistor is disposed on the connection line between the first end of the flying capacitor and the negative electrode of the power supply; the second resistor is disposed on the connection line between the second end of the flying capacitor and the positive electrode of the power supply; and the third resistor is disposed on the second connection line between the second end of the flying capacitor and the negative electrode of the power supply. In this way, the resistors divide a voltage, so that voltages at two ends of the flying capacitor can be controlled.

In one embodiment, there are two switches, and the switches are a first dual-contact relay and a second dual-contact relay; the first resistor and the second resistor are electrically connected to the first dual-contact relay separately, and the third resistor and the fourth resistor are electrically connected to the second dual-contact relay separately; and the first dual-contact relay is electrically connected to the positive electrode of the power supply, and the second dual-contact relay is electrically connected to the negative electrode of the power supply.

In the solution shown in this embodiment of the present disclosure, there are two switches, and the switches are the first dual-contact relay and the second dual-contact relay.

The first dual-contact relay may be disposed between the first resistor and the positive electrode of the power supply, and the first dual-contact relay may be disposed between the second resistor and the positive electrode of the power supply. In this way, because the controller controls a dual-contact relay by using a coil, the controller 4 can control the first dual-contact relay by using one coil, and therefore, can simultaneously control connection/disconnection of a line between the positive electrode of the power supply and the first resistor and connection/disconnection of a line between the positive electrode of the power supply and the second resistor.

The second dual-contact relay may be disposed between the third resistor and the negative electrode of the power supply, and the second dual-contact relay may be disposed between the fourth resistor and the negative electrode of the power supply. In this way, because the controller controls a dual-contact relay by using a coil, the controller can control the first dual-contact relay by using one coil, and therefore, can simultaneously control connection/disconnection of a line between the negative electrode of the power supply and the third resistor and connection/disconnection of a line between the negative electrode of the power supply and the fourth resistor.

In this kind of connection, the first resistor is electrically connected to the first end of the flying capacitor, the second resistor is electrically connected to the second end of the flying capacitor, the third resistor is electrically connected to the second end of the flying capacitor, and the fourth resistor is electrically connected to the first end of the flying capacitor.

In one embodiment, there are four switches, and the switches are single-pole single-throw relays.

In the solution shown in this embodiment of the present disclosure, it is equivalent to that each resistor is connected to one switch.

In one embodiment, the switches are a first single-pole single-throw relay, a second single-pole single-throw relay, a third single-pole single-throw relay, and a fourth single-pole single-throw relay; the first single-pole single-throw relay is disposed on a connection line between the first resistor and the positive electrode of the power supply; the second single-pole single-throw relay is disposed on a connection line between the second resistor and the positive electrode of the power supply; the third single-pole single-throw relay is disposed on a connection line between the third resistor and the negative electrode of the power supply; and the fourth single-pole single-throw relay is disposed on a connection line between the fourth resistor and the negative electrode of the power supply.

In the solution shown in this embodiment of the present disclosure, the single-pole single-throw relays are disposed between the power supply and the resistors.

In one embodiment, the switches are a fifth single-pole single-throw relay, a sixth single-pole single-throw relay, a seventh single-pole single-throw relay, and an eighth single-pole single-throw relay; the fifth single-pole single-throw relay is disposed on a connection line between the first resistor and the first end of the flying capacitor; the sixth single-pole single-throw relay is disposed on a connection line between the second resistor and the first end of the flying capacitor; the seventh single-pole single-throw relay is disposed on a connection line between the third resistor and the second end of the flying capacitor; and the eighth single-pole single-throw relay is disposed on a connection line between the fourth resistor and the second end of the flying capacitor.

In the solution shown in this embodiment of the present disclosure, the single-pole single-throw relays are disposed between the flying capacitor and the resistors.

In one embodiment, there are four switches, and the switches are metal-oxide-semiconductor field-effect transistors (MOS transistors) or triodes.

The MOS transistors are metal oxide semiconductor field-effect transistors.

In the solution shown in this embodiment of the present disclosure, besides the main topology, one switch is disposed on each line connecting the flying capacitor and the power supply, and the switch is a MOS transistor or a triode.

In one embodiment, there is one switch, and the switch is a four-contact relay.

In the solution shown in this embodiment of the present disclosure, there is one switch, and the switch is a four-contact relay, which is equivalent to having four contacts. The four-contact relay may be disposed between the first resistor and the first end of the flying capacitor, the four-contact relay may be disposed between the second resistor and the second end of the flying capacitor, the four-contact relay may be disposed between the third resistor and the second end of the flying capacitor, or the four-contact relay may be disposed between the fourth resistor and the first end of the flying capacitor. In this way, because the controller controls a four-contact relay by using a coil, the controller can control the four-contact relay by using one coil, and therefore, can simultaneously control connection/disconnection of the line between the positive electrode of the power supply and the first end of the flying capacitor, connection/disconnection of the line between the positive electrode of the power supply and the second end of the flying capacitor, connection/disconnection of the line between the negative electrode of the power supply and the first end of the flying capacitor, and connection/disconnection of the line between the negative electrode of the power supply and the second end of the flying capacitor.

In one embodiment, the present disclosure also includes a method of operating a multi-level inverter that includes operating the controller as discussed herein.

Beneficial effects brought by the technical solutions provided in the embodiments of the present disclosure include at least the following:

In the embodiments of the present disclosure, before the main topology of the multi-level inverter starts to work, the controller may control the switch to be closed, to charge the flying capacitor; and when detecting that charging the flying capacitor is completed, the controller may control the switch to be open. Then, the controller may control the main topology to start to work. In this way, when the main topology starts to work, there is a voltage at two ends of the flying capacitor, and there is also a voltage at two ends of the semiconductor switches that are connected to the flying capacitor in parallel. A voltage of the semiconductor switch on the connection line between the flying capacitor and the positive/negative electrode of the power supply is equal to a voltage of the power supply minus a voltage of the flying capacitor. Therefore, the voltage of the semiconductor switch on the connection line between the flying capacitor and the power supply is no longer the voltage of the power supply, thereby preventing the semiconductor switches in the main topology from being damaged.

REFERENCE NUMERALS

| 1: main topology | 11: power supply |
| 12: flying capacitor | 13: semiconductor switch |
| 2: resistor | 3: switch |
| 4: controller | |

DESCRIPTION OF EMBODIMENTS

To make the objectives, technical solutions, and advantages of this application clearer, the following first describes a three-level inverter in the prior art.

Figure 1:
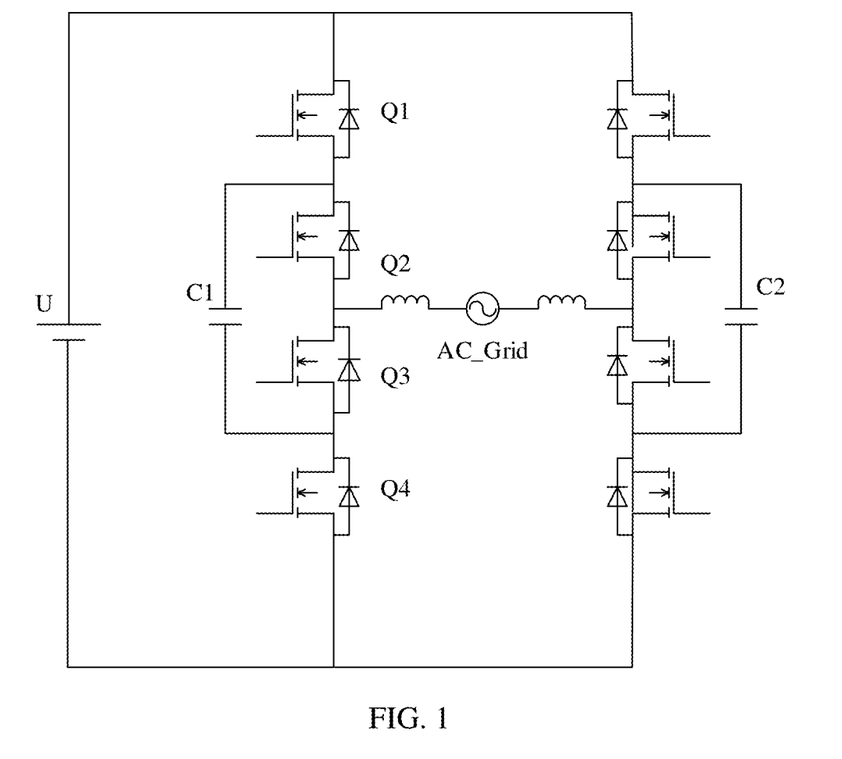
FIG. 1 is a schematic diagram of a structure of a three-level inverter according to an embodiment of the present disclosure.

In a related art, a multi-level inverter includes a three-level inverter, a five-level inverter, and the like. Herein, the three-level inverter is used as an example for description. A topology diagram of a flying-capacitor-clamped three-level inverter is shown in FIG. 1. Flying capacitors are C1 and C2, a power supply is U, and there are eight semiconductor switches. The flying capacitor C1 is used as an example, and four semiconductor switches are Q1, Q2, Q3, and Q4. Because C1 is connected to two semiconductor switches in parallel, a voltage of C1 is equal to half of a voltage of the power supply. By controlling Q1, Q2, Q3, and Q4, it can be implemented that three level states are output. When the three-level inverter just starts up, voltages at two ends of C1 are 0. Therefore, a voltage of Q2 and a voltage of Q3 are also 0, and the voltage of the power supply is all applied to Q1 and Q4. When one of Q1 and Q4 starts up, the started semiconductor switch is equivalent to a resistor with a small resistance value. As a result, the voltage of the power supply is all applied to the other not-started semiconductor switch of Q1 and Q4. When a rated maximum voltage of the semiconductor switch is fixed, the semiconductor switch may be damaged due to an excessively high voltage.

For ease of understanding of the embodiments of the present disclosure, the following first describes an application scenario and a concept of a term in the embodiments of the present disclosure.

The embodiments of the present disclosure may be applied to a multi-level inverter including a flying capacitor 12. The multi-level inverter may be configured to convert a direct current into an alternating current and output a plurality of level states.

A flying capacitor is a capacitor that is connected to a semiconductor switch 13 in parallel in a multi-level inverter.

A multi-level inverter is an apparatus that converts a direct current into an alternating current and outputs a plurality of level states, for example, a three-level inverter or a five-level inverter. The three-level inverter may output three level states, and the five-level inverter may output five level states.

In the embodiments of the present disclosure, an example in which a multi-level inverter is a three-level inverter is used for detailed description of the solutions.

An embodiment of the present disclosure provides a multi-level inverter. The multi-level inverter includes a main topology 1, at least four resistors 2, a switch 3, and a controller 4, and the main topology 1 includes a power supply 11, at least one flying capacitor 12, and at least four semiconductor switches 13; a first end of the flying capacitor 12 is electrically connected to a positive electrode of the power supply 11, a second end of the flying capacitor 12 is electrically connected to a negative electrode of the power supply 11, the controller 4 is electrically connected to the switch 3, the flying capacitor 12 is connected to at least two semiconductor switches 13 in parallel, at least one semiconductor switch 13 is disposed on a first connection line between the first end of the flying capacitor 12 and the positive electrode of the power supply, and at least one semiconductor switch 13 is disposed on a first connection line between the second end of the flying capacitor 12 and the negative electrode of the power supply; the switch 3 and at least one resistor 2 are disposed on a second connection line between the first end of the flying capacitor 12 and the positive electrode of the power supply 11; the switch 3 and at least one resistor 2 are disposed on a connection line between the first end of the flying capacitor 12 and the negative electrode of the power supply 11; the switch 3 and at least one resistor 2 are disposed on a connection line between the second end of the flying capacitor 12 and the positive electrode of the power supply 11; the switch 3 and at least one resistor 2 are disposed on a second connection line between the second end of the flying capacitor 12 and the negative electrode of the power supply 11; and the controller 4 is configured to: before the main topology 1 works, control the switch 3 to be closed, and when detecting that charging the flying capacitor 12 is completed, control the switch 3 to be open.

Figure 2A:
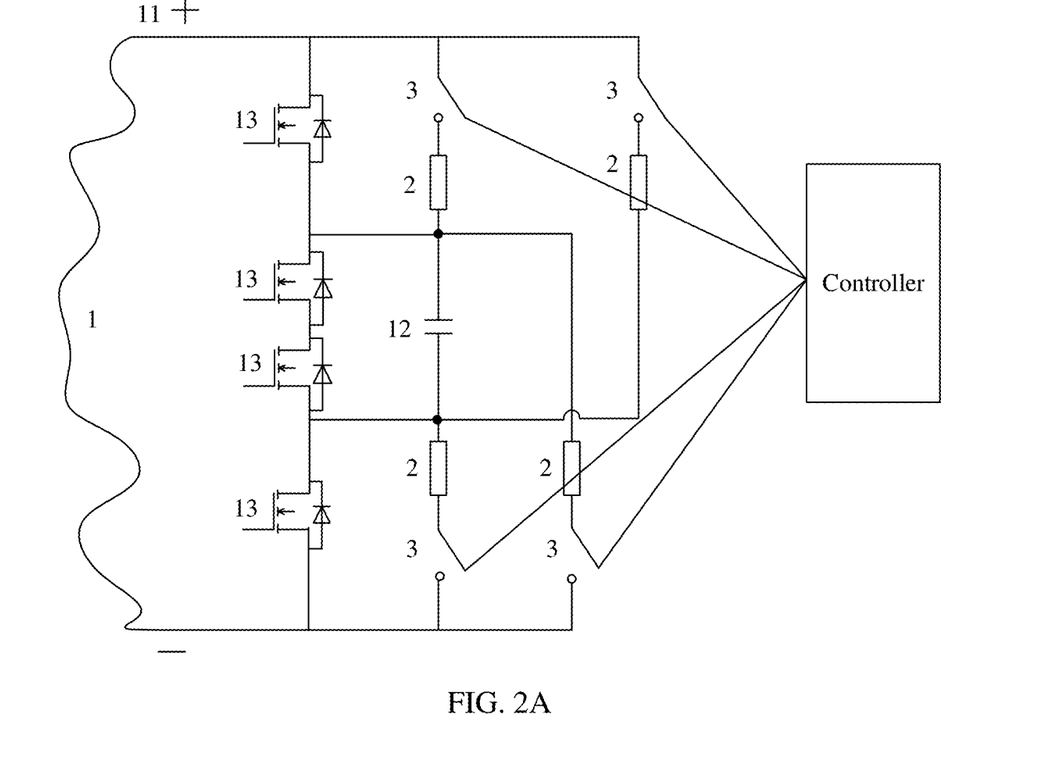
FIG. 2A is a schematic diagram of a structure of a three-level inverter according to an embodiment of the present disclosure.

In one embodiment, as shown in FIG. 2A, the multi-level inverter includes the main topology 1, the at least four resistors 2, the switch 3, and the controller 4, the main topology 1 may include at least the power supply 11, the at least one flying capacitor 12, and the at least four semiconductor switches 13 (the semiconductor switch may be one type of the switch), and the main topology 1 is configured to convert a direct current into an alternating current and output a plurality of level states. The flying capacitor 12 includes the first end and the second end. The first end may be an upper plate of the flying capacitor 12, and the second end may be a lower plate of the flying capacitor 12, or the first end may be the other end of a conducting wire connected to an upper plate of the flying capacitor 12 (an end of the conducting wire other than an end connected to the upper plate), and the second end may be the other end of a conducting wire connected to a lower plate of the flying capacitor 12 (an end of the conducting wire other than an end connected to the lower plate).

The first end of the flying capacitor 12 may be electrically connected to the positive electrode of the power supply 11 by using a conducting wire, and there are two connection lines between the first end of the flying capacitor 12 and the positive electrode of the power supply 11. The second end of the flying capacitor 12 may be electrically connected to the negative electrode of the power supply 11 by using a conducting wire, and there are two connection lines between the second end of the flying capacitor 12 and the negative electrode of the power supply 11. The controller 4 may be electrically connected to the switch 3, and is configured to control the switch 3 to be closed, open, or the like. The flying capacitor 12 is connected to at least two semiconductor switches 13 in parallel, at least one semiconductor switch 13 is disposed on the first connection line between the first end of the flying capacitor 12 and the positive electrode of the power supply 11, and at least one semiconductor switch 13 is disposed on the first connection line between the second end of the flying capacitor 12 and the negative electrode of the power supply 11.

The switch 3 and at least one resistor 2 may be disposed on the second connection line between the first end of the flying capacitor 12 and the positive electrode of the power supply 11. The switch 3 and at least one resistor 2 may be disposed on the connection line between the first end of the flying capacitor 12 and the negative electrode of the power supply 11. The switch 3 and at least one resistor 2 may be disposed on the connection line between the second end of the flying capacitor 12 and the positive electrode of the power supply 11. The switch 3 and at least one resistor 2 may be disposed on the second connection line between the second end of the flying capacitor 12 and the negative electrode of the power supply 11. In this way, by controlling resistance values of the at least four resistors 2, a voltage of the flying capacitor 12 can be controlled, in other words, a voltage of the flying capacitor 12 can be controlled at a time at which charging the flying capacitor 12 is completed.

Before the main topology 1 starts to work, the controller 4 may control the switch 3 to be closed. In this case, the power supply 11 starts to charge the flying capacitor 12. The controller 4 may detect whether charging the flying capacitor 12 is completed. If detecting that charging the flying capacitor 12 is completed, the controller 4 may control the switch 3 to be open. In this case, there is a voltage at two ends of the flying capacitor 12. When the multi-level inverter just starts to work, there is also a voltage at two ends of the semiconductor switches 13 that are connected to the flying capacitor 12 in parallel. A voltage of the semiconductor switch 13 that is connected to the flying capacitor 12 in series (which is actually the semiconductor switch 13 that is connected in series to the switches that are connected to the flying capacitor 12 in parallel) is equal to a voltage of the power supply 11 minus the voltage of the flying capacitor 12. Therefore, the voltage of the semiconductor switch 13 that is connected to the flying capacitor 12 in series is no longer the voltage of the power supply 11. The voltage of the semiconductor switch 13 that is connected to the flying capacitor 12 in series is comparatively low, thereby reducing a damage rate of the semiconductor switch 13.

It should be noted that FIG. 2A is only a schematic diagram of a structure of a multi-level inverter that is a three-level inverter. For other multi-level inverters, similarly, the resistor 2, the switch 3, and the like are added to the existing main topology 1 that is configured to output a plurality of level states. Before the main topology works, the flying capacitor in the main topology 1 is charged first. After the charging is completed, the switch 3 is open, and the main topology 1 starts to work.

Figure 2B:
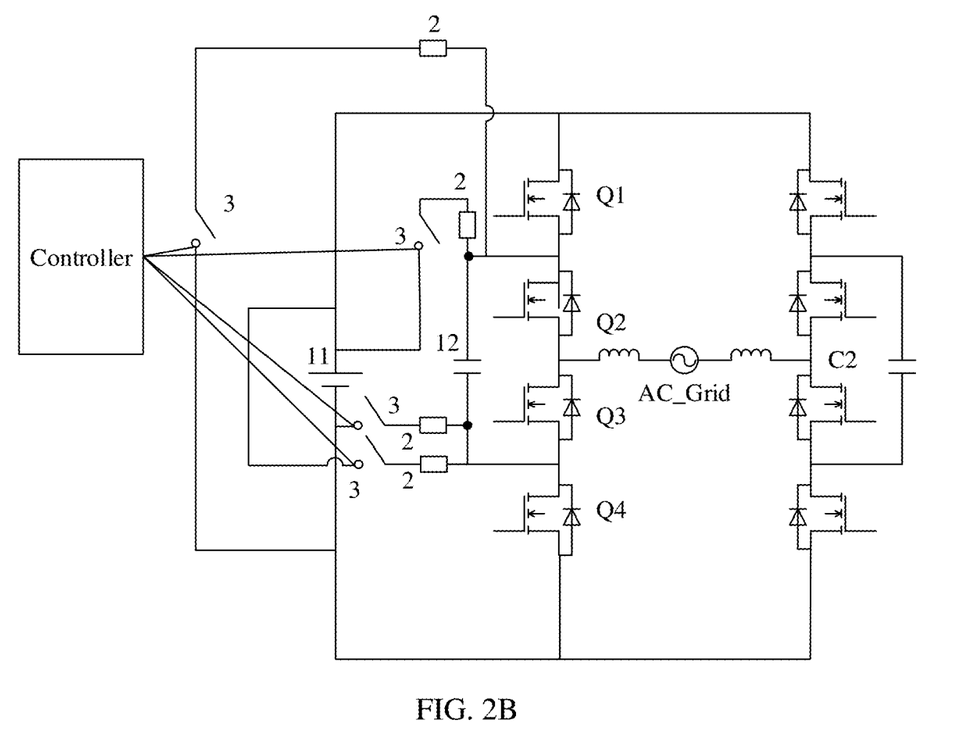
FIG. 2B is a schematic diagram of a structure of a three-level inverter according to an embodiment of the present disclosure.

In one embodiment, the main topology 1 in the multi-level inverter is configured to convert a direct current into an alternating current and output a plurality of level states. The main topology 1 may further include some necessary inductors and the like. The main topology 1 is the same as a topology diagram of a prior-art circuit that can convert a direct current into an alternating current and output a plurality of level states. In addition, in both topology diagrams, the semiconductor switches 13 and the flying capacitor 12 are connected in parallel. For example, the main topology 1 may be combined with the three-level inverter shown in FIG. 1, as shown in FIG. 2B.

In one embodiment, the controller 4 may detect, in a plurality of manners, that charging the flying capacitor 12 is completed. The following describes two feasible manners.

Manner 1: The controller 4 is electrically connected to the first end of the flying capacitor and the second end of the flying capacitor separately, and the controller 4 is configured to: when detecting that a voltage of the flying capacitor 12 is a preset value, control the switch 3 to be open.

The preset value may be pre-set by a skilled person and stored in the multi-level inverter. The preset value is determined based on the voltage of the power supply 11 and the at least four resistors 2.

Figure 3:
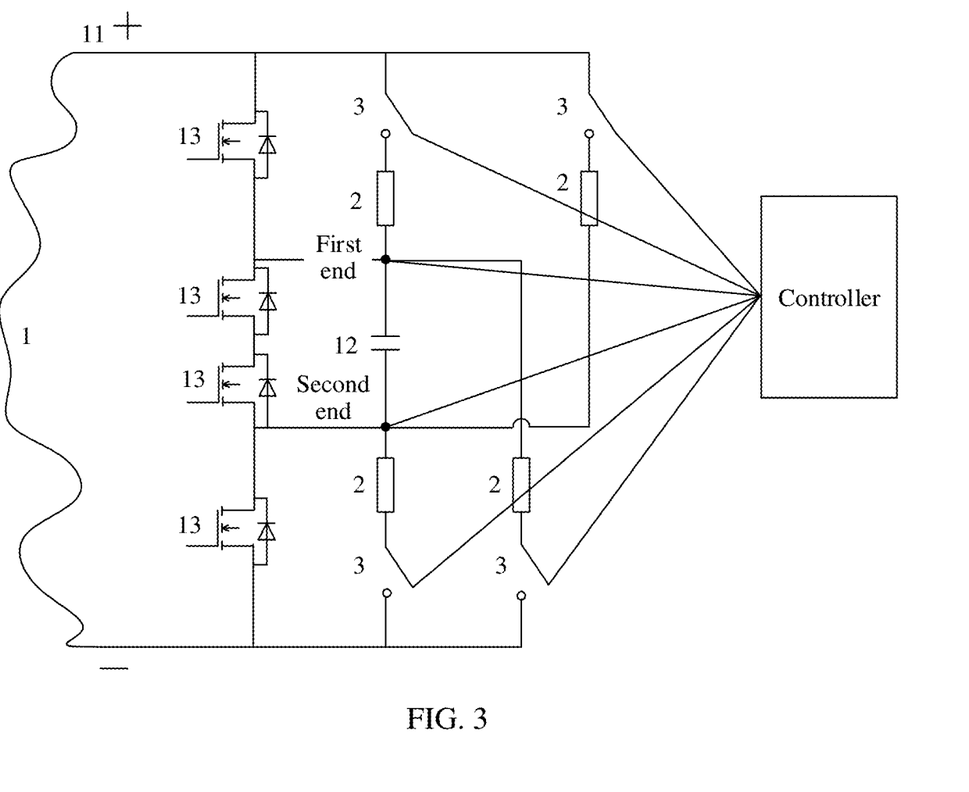
FIG. 3 is a schematic diagram of a structure of a three-level inverter according to an embodiment of the present disclosure.

In one embodiment, as shown in FIG. 3, the controller 4 is electrically connected to the first end of the flying capacitor 12, and the controller 4 is electrically connected to the second end of the flying capacitor 12.

The controller 4 may detect a voltage at the first end of the flying capacitor 12, detect a voltage at the second end of the flying capacitor 12, and then obtain a difference between the voltage at the first end and the voltage at the second end. The obtained value is the voltage of the flying capacitor 12. When the controller 4 determines that the voltage of the flying capacitor 12 is equal to the preset value, the controller 4 may determine that charging the flying capacitor 12 is completed, and may control the switch 3 to be open.

Alternatively, a voltmeter is connected to the controller 4, one end of the voltmeter is electrically connected to the first end of the flying capacitor 12, and a second end of the voltmeter is electrically connected to the second end of the flying capacitor 12. After controlling the switch 3 to be closed, the controller 4 may obtain a voltage detected by the voltmeter. When a voltage of the flying capacitor 12 obtained by the controller 4 is equal to the preset value, the controller 4 may determine that charging the flying capacitor 12 is completed, and may control the switch 3 to be open.

Manner 2: The controller 4 obtains first duration during which the switch 3 is closed, and when the first duration is equal to preset duration, controls the switch 3 to be open.

The preset duration may be pre-set by a skilled person and stored in the multi-level inverter. The preset duration is determined based on the voltage of the power supply 11 and the at least four resistors 2. Usually, the preset duration is equal to duration required by the power supply 11 for fully charging the flying capacitor 12.

In one embodiment, when controlling the switch 3 to be closed, the controller 4 may obtain duration during which the switch 3 is closed, and keep timing. When first duration obtained through timing is equal to the preset duration, the controller 4 may determine that charging the flying capacitor 12 is completed, and may control the switch 3 to be open.

In one embodiment, the controller 4 may further control the main topology 1 to output at least one level state, and corresponding processing may be as follows:

Control the main topology 1 to output at least one level state.

In one embodiment, the controller 4 is electrically connected to the main topology 1, and after controlling the switch 3 to be open, the controller 4 may control the main topology 1 to work, in other words, control the semiconductor switches 13 in the main topology 1 to be closed or open, to output at least one level state.

In one embodiment, when the at least four resistors 2 are four resistors 2, the at least four resistors 2 are a first resistor 2, a second resistor 2, a third resistor 2, and a fourth resistor 2, and a connection relationship is shown as follows:

The first resistor 2 is disposed on the second connection line between the first end of the flying capacitor 12 and the positive electrode of the power supply 11; the fourth resistor 2 is disposed on the connection line between the first end of the flying capacitor 12 and the negative electrode of the power supply 11; the second resistor 2 is disposed on the connection line between the second end of the flying capacitor 12 and the positive electrode of the power supply 11; and the third resistor 2 is disposed on the second connection line between the second end of the flying capacitor 12 and the negative electrode of the power supply 11.

Figure 4:
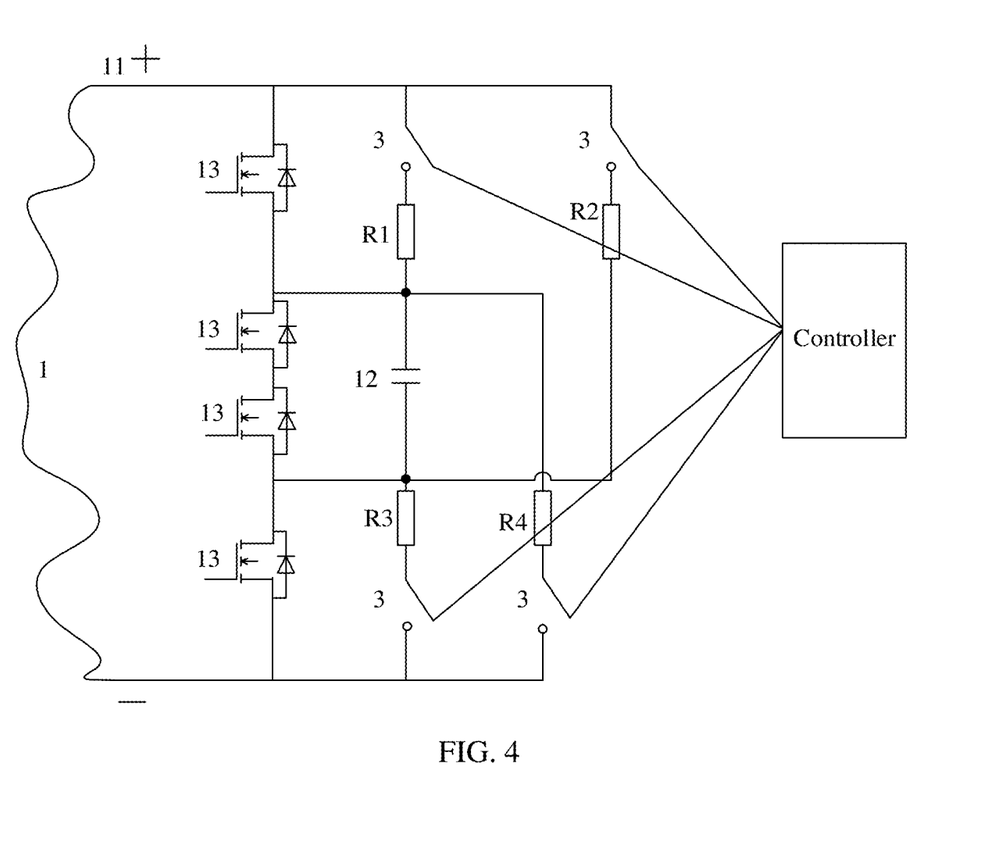
FIG. 4 is a schematic diagram of a structure of a three-level inverter according to an embodiment of the present disclosure.

In one embodiment, as shown in FIG. 4, the at least four resistors 2 are the first resistor 2 (R1), the second resistor 2 (R2), the third resistor 2 (R3), and the fourth resistor 2 (R4); the first resistor 2 may be disposed on the second connection line between the first end of the flying capacitor 12 and the positive electrode of the power supply 11; the fourth resistor 2 is disposed on the connection line between the first end of the flying capacitor 12 and the negative electrode of the power supply 11; the second resistor 2 is disposed on the connection line between the second end of the flying capacitor 12 and the positive electrode of the power supply 11; and the third resistor 2 is disposed on the second connection line between the second end of the flying capacitor 12 and the negative electrode of the power supply 11.

In this case, if the voltage of the power supply 11 is U, the voltage at the first end of the flying capacitor 12 is $U1=U*R4/(R1+R4)$, and the voltage at the second end of the flying capacitor is $U2=U*R3/(R2+R3)$. In this case, the voltage of the flying capacitor 12 is $U1-U2$, and the foregoing mentioned preset value may be equal to $U1-U2$.

It should be noted that a skilled person may determine a resistance value of the resistor 2 based on a maximum voltage that can be borne by each switch that is in the main topology 1 and that is connected to the flying capacitor 12 in series. Because a voltage of the semiconductor switch 13 on the first connection line between the first end of the flying capacitor 12 and the positive electrode of the power supply 11 and a voltage of the semiconductor switch 13 on the first connection line between the second end of the flying capacitor 12 and the negative electrode of the power supply 11 are equal to a difference obtained by subtracting the voltage of the flying capacitor 12 from the voltage of the power supply 11, none of the semiconductor switches 13 is burnt out, provided that the difference is less than a maximum voltage that can be borne by each of the two semiconductor switches 13 mentioned in this paragraph, and a voltage borne by the at least two semiconductor switches that are connected to the flying capacitor 12 in parallel does not exceed a maximum voltage that can be borne. For example, there are four semiconductor switches 13 in total, the voltage of the power supply 11 is 220 V, and a voltage that can be borne by each semiconductor switch 13 in the main topology is 150 V. The resistance value of the resistor 2 is calculated, to ensure that a sum of voltages borne by the two semiconductor switches 13 that are connected to the flying capacitor 12 in parallel is greater than 70 V and less than 150 V. In this way, it can be ensured that each semiconductor switch on a connection line between the flying capacitor 12 and the power supply 11 is not burnt out.

In one embodiment, there are four switches 3, and the switches 3 are single-pole single-throw relays.

In one embodiment, when there are four switches 3, the resistors 2 may be connected in two manners, which are described below separately.

In a first manner, the switches 3 are a first single-pole single-throw relay, a second single-pole single-throw relay, a third single-pole single-throw relay, and a fourth single-pole single-throw relay; the first single-pole single-throw relay is disposed on a connection line between the first resistor 2 and the positive electrode of the power supply 11; the second single-pole single-throw relay is disposed on a connection line between the second resistor 2 and the positive electrode of the power supply 11; the third single-pole single-throw relay is disposed on a connection line between the third resistor 2 and the negative electrode of the power supply 11; and the fourth single-pole single-throw relay is disposed on a connection line between the fourth resistor 2 and the negative electrode of the power supply 11.

In one embodiment, as shown in FIG. 2A, the switches 3 are the first single-pole single-throw relay, the second single-pole single-throw relay, the third single-pole single-throw relay, and the fourth single-pole single-throw relay; the first single-pole single-throw relay is disposed on the connection line between the first resistor 2 and the positive electrode of the power supply 11, and the first resistor 2 is connected to the first end of the flying capacitor 12; the second single-pole single-throw relay is disposed on the connection line between the second resistor 2 and the positive electrode of the power supply 11, and the second resistor 2 is connected to the second end of the flying capacitor 12; the third single-pole single-throw relay is disposed on the connection line between the third resistor 2 and the negative electrode of the power supply 11, and the third resistor 2 is connected to the second end of the flying capacitor 12; and the fourth single-pole single-throw relay is disposed on the connection line between the fourth resistor 2 and the negative electrode of the power supply 11, and the fourth resistor 2 is connected to the first end of the flying capacitor 12.

Figure 5:
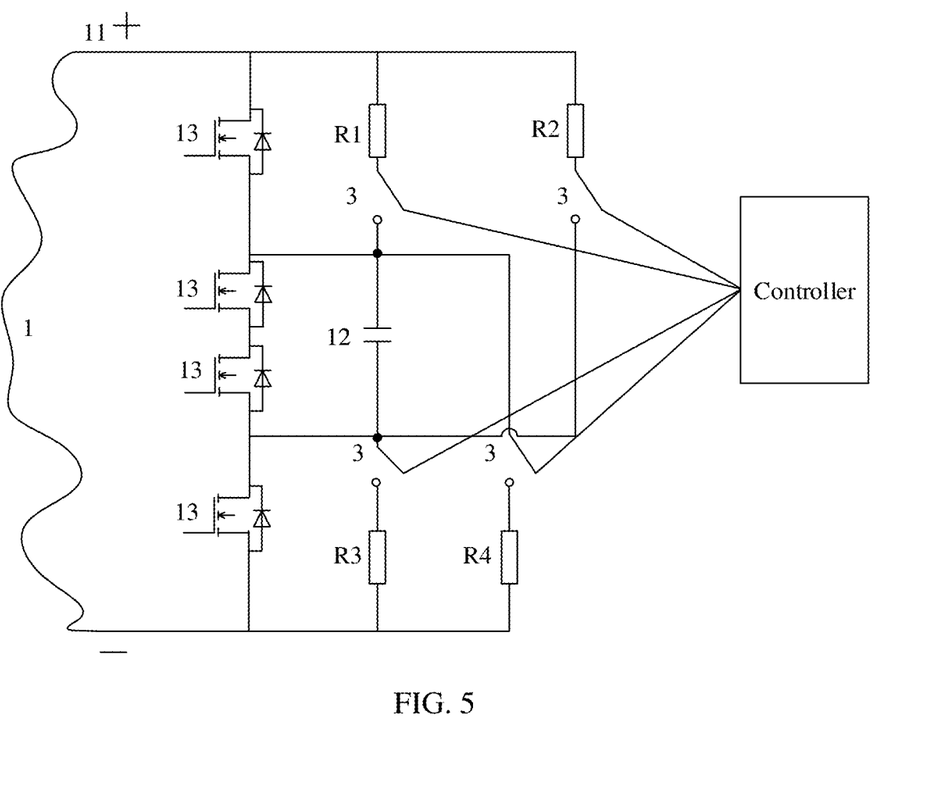
FIG. 5 is a schematic diagram of a structure of a three-level inverter according to an embodiment of the present disclosure.

In a second manner, as shown in FIG. 5, the switches 3 are a fifth single-pole single-throw relay, a sixth single-pole single-throw relay, a seventh single-pole single-throw relay, and an eighth single-pole single-throw relay; the fifth single-pole single-throw relay is disposed on a connection line between the first resistor 2 and the first end of the flying capacitor 12; the sixth single-pole single-throw relay is disposed on a connection line between the second resistor 2 and the first end of the flying capacitor 12; the seventh single-pole single-throw relay is disposed on a connection line between the third resistor 2 and the second end of the flying capacitor 12; and the eighth single-pole single-throw relay is disposed on a connection line between the fourth resistor 2 and the second end of the flying capacitor 12.

In one embodiment, the switches 3 are the fifth single-pole single-throw relay, the sixth single-pole single-throw relay, the seventh single-pole single-throw relay, and the eighth single-pole single-throw relay; the fifth single-pole single-throw relay is disposed on the connection line between the first resistor 2 and the first end of the flying capacitor 12, and the first resistor 2 is connected to the positive electrode of the power supply; the sixth single-pole single-throw relay is disposed on the connection line between the second resistor 2 and the first end of the flying capacitor 12, and the second resistor 2 is connected to the negative electrode of the power supply; the seventh single-pole single-throw relay is disposed on the connection line between the third resistor 2 and the second end of the flying capacitor 12, and the third resistor 2 is connected to the negative electrode of the power supply; and the eighth single-pole single-throw relay is disposed on the connection line between the fourth resistor 2 and the second end of the flying capacitor 12, and the fourth resistor 2 is connected to the positive electrode of the power supply.

It should be noted that in the foregoing two cases, the controller 4 is electrically connected to the four switches 3 separately, and the controller 4 may control the four switches 3 to be simultaneously closed or to be simultaneously open.

In one embodiment, there are two switches 3, and the switches 3 are a first dual-contact relay and a second dual-contact relay; the first resistor 2 and the second resistor 2 are electrically connected to the first dual-contact relay separately, and the third resistor 2 and the fourth resistor 2 are electrically connected to the second dual-contact relay separately; and the first dual-contact relay is electrically connected to the positive electrode of the power supply 11, and the second dual-contact relay is electrically connected to the negative electrode of the power supply 11.

A dual-contact relay is a relay with two contacts, and the two contacts may be controlled to be simultaneously closed or simultaneously open by using a same coil.

In one embodiment, there are two switches 3, and the switches 3 are the first dual-contact relay and the second dual-contact relay.

Figure 6:
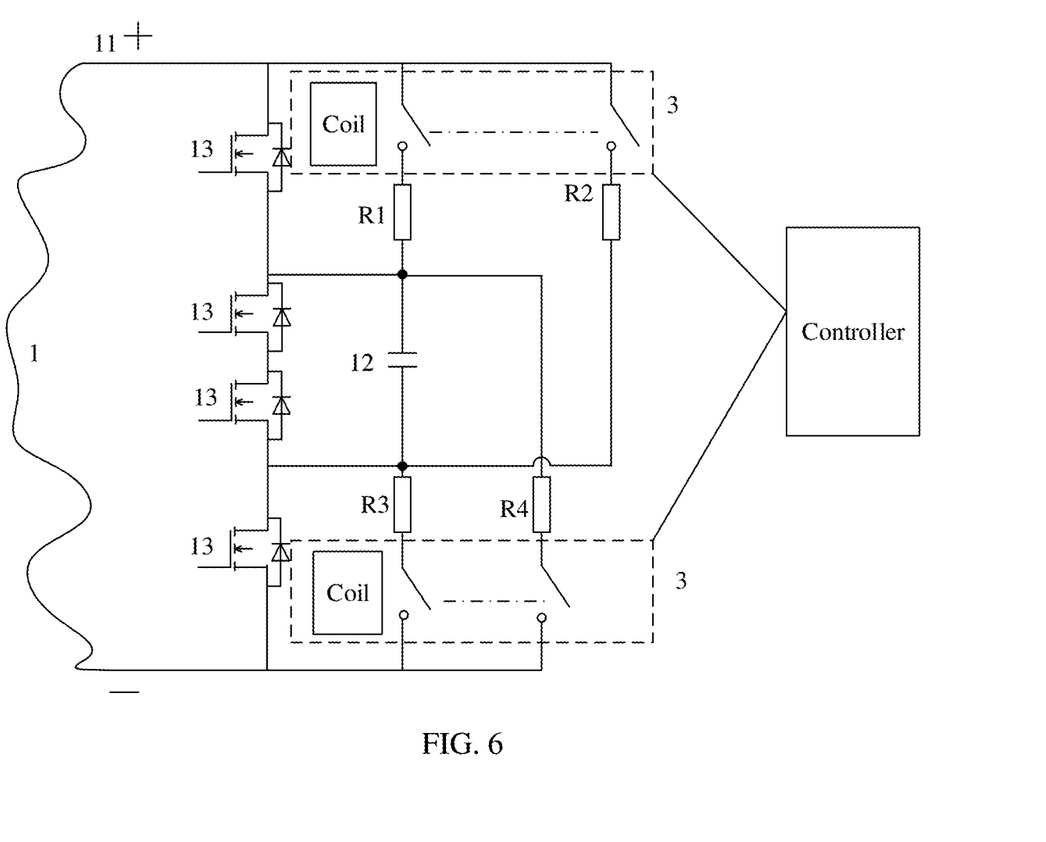
FIG. 6 is a schematic diagram of a structure of a three-level inverter according to an embodiment of the present disclosure.

As shown in FIG. 6, the first dual-contact relay may be disposed between the first resistor 2 and the positive electrode of the power supply, and the first dual-contact relay may be disposed between the second resistor and the positive electrode of the power supply. In this way, because the controller 4 controls a dual-contact relay by using a coil, the controller 4 can control the first dual-contact relay by using one coil, and therefore, can simultaneously control connection/disconnection of a line between the positive electrode of the power supply 11 and the first resistor 2 and connection/disconnection of a line between the positive electrode of the power supply 11 and the second resistor 2.

The second dual-contact relay may be disposed between the third resistor 2 and the negative electrode of the power supply, and the second dual-contact relay may be disposed between the fourth resistor and the negative electrode of the power supply. In this way, because the controller 4 controls a dual-contact relay by using a coil, the controller 4 can control the first dual-contact relay by using one coil, and therefore, can simultaneously control connection/disconnection of a line between the negative electrode of the power supply 11 and the third resistor 2 and connection/disconnection of a line between the negative electrode of the power supply 11 and the fourth resistor 2.

In this kind of connection, the first resistor 2 is electrically connected to the first end of the flying capacitor 12, the second resistor 2 is electrically connected to the second end of the flying capacitor 12, the third resistor 2 is electrically connected to the second end of the flying capacitor 12, and the fourth resistor 2 is electrically connected to the first end of the flying capacitor 12.

In addition, there are two switches 3, and the switches 3 are a first dual-contact relay and a second dual-contact relay.

Figure 7:
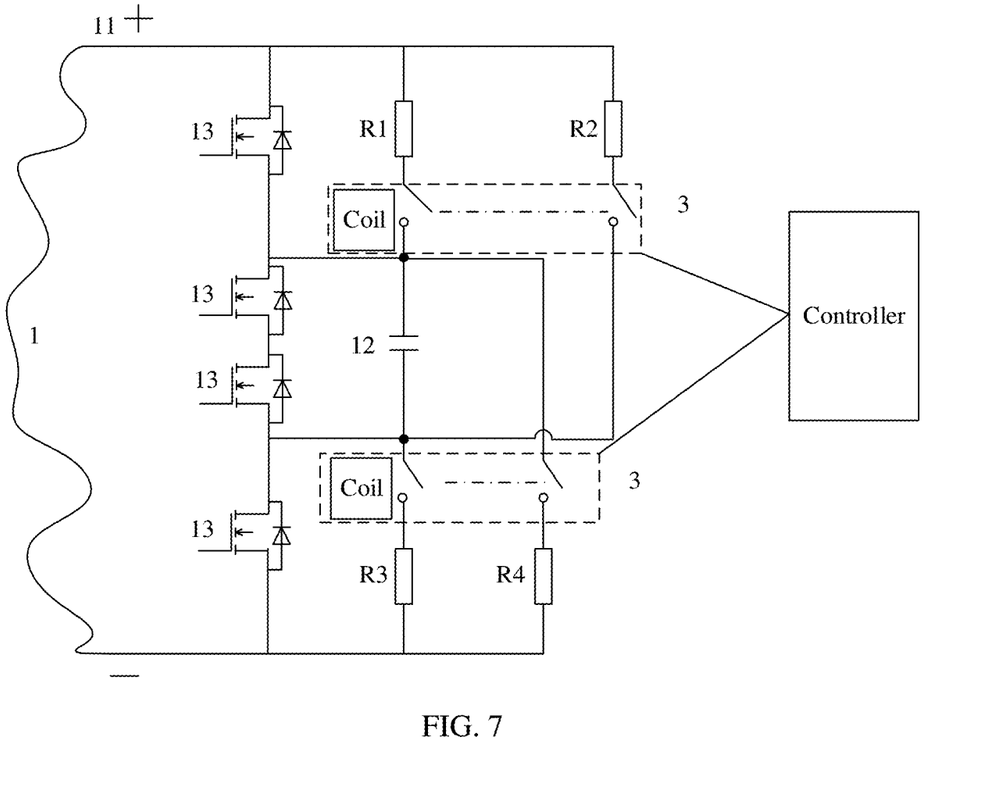
FIG. 7 is a schematic diagram of a structure of a three-level inverter according to an embodiment of the present disclosure.

As shown in FIG. 7, the first dual-contact relay may be disposed between the first resistor 2 and the first end of the flying capacitor 12, and the first dual-contact relay may be disposed between the second resistor 2 and the second end of the flying capacitor 12. In this way, because the controller 4 controls a dual-contact relay by using a coil, the controller 4 can control the first dual-contact relay by using one coil, and therefore, can simultaneously control connection/disconnection of a line between the positive electrode of the power supply 11 and the first end of the flying capacitor 12 and connection/disconnection of a line between the positive electrode of the power supply 11 and the second end of the flying capacitor 12.

The second dual-contact relay may be disposed between the third resistor 2 and the second end of the flying capacitor 12, and the second dual-contact relay may be disposed between the fourth resistor 2 and the first end of the flying capacitor 12. In this way, because the controller 4 controls a dual-contact relay by using a coil, the controller 4 can control the second dual-contact relay by using one coil, and therefore, can simultaneously control connection/disconnection of a line between the negative electrode of the power supply 11 and the first end of the flying capacitor 12 and connection/disconnection of a line between the negative electrode of the power supply 11 and the second end of the flying capacitor 12.

In this kind of connection, the first resistor 2 is electrically connected to the positive electrode of the power supply 11, the second resistor 2 is electrically connected to the positive electrode of the power supply 11, the third resistor 2 is electrically connected to the negative electrode of the power supply 11, and the fourth resistor 2 is electrically connected to the negative electrode of the power supply 11.

In one embodiment, there is one switch 3, and the switch 3 is a four-contact relay.

In one embodiment, there is one switch 3, and the switch 3 is a four-contact relay, including four contacts.

In one embodiment, when the at least four resistors 2 are the first resistor 2, the second resistor 2, the third resistor 2, and the fourth resistor 2, the four-contact relay may be disposed between the first resistor 2 and the first end of the flying capacitor 12, the four-contact relay may be disposed between the second resistor 2 and the second end of the flying capacitor 12, the four-contact relay may be disposed between the third resistor 2 and the second end of the flying capacitor 12, or the four-contact relay may be disposed between the fourth resistor 2 and the first end of the flying capacitor 12. In this way, because the controller 4 controls a four-contact relay by using a coil, the controller 4 can control the four-contact relay by using one coil, and therefore, can simultaneously control connection/disconnection of the line between the positive electrode of the power supply 11 and the first end of the flying capacitor 12, connection/disconnection of the line between the positive electrode of the power supply 11 and the second end of the flying capacitor 12, connection/disconnection of the line between the negative electrode of the power supply 11 and the first end of the flying capacitor 12, and connection/ disconnection of the line between the negative electrode of the power supply 11 and the second end of the flying capacitor 12.

The four-contact relay may be disposed between the first resistor 2 and the positive electrode of the power supply 11, the four-contact relay may be disposed between the second resistor 2 and the positive electrode of the power supply 11, the four-contact relay may be disposed between the third resistor 2 and the negative electrode of the power supply 11, or the four-contact relay may be disposed between the fourth resistor 2 and the negative electrode of the power supply 11. In this way, because the controller 4 controls a four-contact relay by using a coil, the controller 4 can control the four-contact relay by using one coil, and therefore, can simultaneously control connection/disconnection of the line between the positive electrode of the power supply 11 and the first end of the flying capacitor 12, connection/disconnection of the line between the positive electrode of the power supply 11 and the second end of the flying capacitor 12, connection/disconnection of the line between the negative electrode of the power supply 11 and the first end of the flying capacitor 12, and connection/disconnection of the line between the negative electrode of the power supply 11 and the second end of the flying capacitor 12.

In one embodiment, besides the relay mentioned above, the switch 3 may alternatively be a semiconductor switch, there are four switches 3, and the switches 3 are MOS transistors or triodes.

In one embodiment, the MOS transistor or the triode may be disposed on the connection line between the first end of the flying capacitor 12 and the positive electrode of the power supply 11; the MOS transistor or the triode may be disposed on the connection line between the first end of the flying capacitor 12 and the negative electrode of the power supply 11; the MOS transistor or the triode may be disposed on the connection line between the second end of the flying capacitor 12 and the positive electrode of the power supply 11; and the MOS transistor or the triode may be disposed on the connection line between the second end of the flying capacitor 12 and the negative electrode of the power supply 11.

In addition, the switch 3 may alternatively be any device that may be configured to control connection/disconnection of a line.

It should be noted that in the embodiments of the present disclosure, FIG. 2A to FIG. 7 show only the power supply 11, the flying capacitor 12, and the semiconductor switches 13 in the main topology 1 of a three-level inverter, and do not show other parts, and only four resistors 2 are shown in FIG. 2A.

In the embodiments of the present disclosure, before the main topology of the multi-level inverter starts to work, the controller may control the switch to be closed, to charge the flying capacitor; and when detecting that charging the flying capacitor is completed, the controller may control the switch to be open. Then, the controller may control the main topology to start to work. In this way, when the main topology starts to work, there is a voltage at the two ends of the flying capacitor, and there is also a voltage at the two ends of the semiconductor switches that are connected to the flying capacitor in parallel. A voltage of the semiconductor switch on the connection line between the flying capacitor and the positive/negative electrode of the power supply is equal to the voltage of the power supply minus the voltage of the flying capacitor. Therefore, the voltage of the semiconductor switch on the connection line between the flying capacitor and the power supply is no longer the voltage of the power supply, thereby preventing the semiconductor switches in the main topology from being damaged.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a device or a processor, the procedure or functions according to the embodiments of the present disclosure are all or partially generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a base station, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The foregoing descriptions are merely specific embodiments of this application, but are not intended to limit this application. Any modification, equivalent replacement, or improvement made without departing from the spirit and principle of this application should fall within the protection scope of this application.

What is claimed is:

1. A multi-level inverter comprising:
a main topology comprising a power supply, a flying capacitor, and at least four semiconductor switches including a first semiconductor switch, a second semiconductor switch, a third semiconductor switch, and a fourth semiconductor switch;
four resistors including a first resistor, a second resistor, a third resistor, and a fourth resistor;
four single-pole single-throw relays including a first single-pole single-throw relay, a second single-pole single-throw relay, a third single-pole single-throw relay, and a fourth single-pole single-throw relay; and
a controller, wherein
a first end of the flying capacitor is electrically connected to a positive electrode of the power supply, a second end of the flying capacitor is electrically connected to a negative electrode of the power supply, the controller is electrically connected to the first, second, third and fourth single-pole single-throw relays and the main topology, the flying capacitor is connected to the second and third semiconductor switches in parallel, the first semiconductor switch is disposed on a first connection line between the first end of the flying capacitor and the positive electrode of the power supply, and the fourth semiconductor switch is disposed on a first connection line between the second end of the flying capacitor and the negative electrode of the power supply;
the first single-pole single-throw relay and the first resistor are disposed on a connection line between the first end of the flying capacitor and the positive electrode of the power supply;
the second single-pole single-throw relay and the second resistor are disposed on a connection line between the second end of the flying capacitor and the positive electrode of the power supply;
the third single-pole single-throw relay and the third resistor are disposed on a connection line between the second end of the flying capacitor and the negative electrode of the power supply;
the fourth single-pole single-throw relay and the fourth resistor are disposed on a connection line between the first end of the flying capacitor and the negative electrode of the power supply;
the first resistor is disposed on the connection line between the first end of the flying capacitor and the positive electrode of the power supply;
the second resistor is disposed on the connection line between the second end of the flying capacitor and the positive electrode of the power supply;
the third resistor is disposed on the connection line between the second end of the flying capacitor and the negative electrode of the power supply;
the fourth resistor is disposed on the connection line between the first end of the flying capacitor and the negative electrode of the power supply;
the first single-pole single-throw relay is disposed on a connection line between the first resistor and the positive electrode of the power supply;
the second single-pole single-throw relay is disposed on a connection line between the second resistor and the positive electrode of the power supply;
the third single-pole single-throw relay is disposed on a connection line between the third resistor and the negative electrode of the power supply;
the fourth single-pole single-throw relay is disposed on a connection line between the fourth resistor and the negative electrode of the power supply; and wherein
the controller is configured to: before the main topology works, control the first, second, third, and fourth single-pole single-throw relays to be closed, and when detecting that charging the flying capacitor is completed, control the first, second, third, and fourth single-pole single-throw relays to be open.

2. The multi-level inverter according to claim 1, wherein the controller is electrically connected to the first end of the flying capacitor and the second end of the flying capacitor separately; and
the controller is configured to:
when detecting that a voltage of the flying capacitor is a preset value, control the first, second, third, and fourth single-pole single-throw relays to be open.

3. The multi-level inverter according to claim 1, wherein after controlling the first, second, third, and fourth single-pole single-throw relays to be open, the controller is further configured to:
control the main topology to output at least one level state.

4. The multi-level inverter according to claim 1, wherein the first, second, third, and fourth single-pole single-throw relays are metal-oxide-semiconductor field-effect transistors (MOS transistors) or triodes.

5. A multi-level inverter comprising:
a main topology comprising a power supply, a flying capacitor, and at least four semiconductor switches including a first semiconductor switch, a second semiconductor switch, a third semiconductor switch, and a fourth semiconductor switch;
four resistors including a first resistor, a second resistor, a third resistor, and a fourth resistor;

four single-pole single-throw relays including a first single-pole single-throw relay, a second single-pole single-throw relay, a third single-pole single-throw relay, and a fourth single-pole single-throw relay; and
a controller, wherein
a first end of the flying capacitor is electrically connected to a positive electrode of the power supply, a second end of the flying capacitor is electrically connected to a negative electrode of the power supply, the controller is electrically connected to the first, second, third and fourth single-pole single-throw relays and the main topology, the flying capacitor is connected to the second and third semiconductor switches in parallel, the first semiconductor switch is disposed on a first connection line between the first end of the flying capacitor and the positive electrode of the power supply, and the fourth semiconductor switch is disposed on a first connection line between the second end of the flying capacitor and the negative electrode of the power supply;
the first single-pole single-throw relay and the first resistor are disposed on a connection line between the first end of the flying capacitor and the positive electrode of the power supply;
the second single-pole single-throw relay and the second resistor are disposed on a connection line between the second end of the flying capacitor and the positive electrode of the power supply;
the third single-pole single-throw relay and the third resistor are disposed on a connection line between the second end of the flying capacitor and the negative electrode of the power supply;
the fourth single-pole single-throw relay and the fourth resistor are disposed on a connection line between the first end of the flying capacitor and the negative electrode of the power supply;
the first resistor is disposed on the connection line between the first end of the flying capacitor and the positive electrode of the power supply;
the second resistor is disposed on the connection line between the second end of the flying capacitor and the positive electrode of the power supply;
the third resistor is disposed on the connection line between the second end of the flying capacitor and the negative electrode of the power supply;
the fourth resistor is disposed on the connection line between the first end of the flying capacitor and the negative electrode of the power supply;
the first single-pole single-throw relay is disposed on a connection line between the first resistor and the first end of the flying capacitor;
the second single-pole single-throw relay is disposed on a connection line between the second resistor and the second end of the flying capacitor;
the third single-pole single-throw relay is disposed on a connection line between the third resistor and the second end of the flying capacitor;
the fourth single-pole single-throw relay is disposed on a connection line between the fourth resistor and the first end of the flying capacitor; and wherein
the controller is configured to: before the main topology works, control the first, second, third, and fourth single-pole single-throw relays to be closed, and when detecting that charging the flying capacitor is completed, control the first, second, third, and fourth single-pole single-throw relays to be open.

6. A method of operating a multi-level inverter comprising:
controlling a first, second, third, and fourth single-pole single-throw relays to be closed before a main topology works, using a controller; and
controlling the first, second, third, and fourth single-pole single-throw relays to be open when detecting that charging a flying capacitor is completed; wherein the multi-level inverter includes:
the main topology comprising a power supply, the flying capacitor, and at least four semiconductor switches including a first semiconductor switch, a second semiconductor switch, a third semiconductor switch, and a fourth semiconductor switch;
four resistors including a first resistor, a second resistor, a third resistor, and a fourth resistor;
the four single-pole single-throw relays including the first single-pole single-throw relay, the second single-pole single-throw relay, the third single-pole single-throw relay, and the fourth single-pole single-throw relay; and
the controller, wherein
a first end of the flying capacitor is electrically connected to a positive electrode of the power supply, a second end of the flying capacitor is electrically connected to a negative electrode of the power supply, the controller is electrically connected to the first, second, third and fourth single-pole single-throw relays and the main topology, the flying capacitor is connected to the second and third semiconductor switches in parallel, the first semiconductor switch is disposed on a first connection line between the first end of the flying capacitor and the positive electrode of the power supply, and the fourth semiconductor switch is disposed on a first connection line between the second end of the flying capacitor and the negative electrode of the power supply;
the first single-pole single-throw relay and the first resistor are disposed on a connection line between the first end of the flying capacitor and the positive electrode of the power supply;
the second single-pole single-throw relay and the second resistor are disposed on a connection line between the second end of the flying capacitor and the positive electrode of the power supply;
the third single-pole single-throw relay and the third resistor are disposed on a connection line between the second end of the flying capacitor and the negative electrode of the power supply;
the fourth single-pole single-throw relay and the fourth resistor are disposed on a connection line between the first end of the flying capacitor and the negative electrode of the power supply;
the first resistor is disposed on the connection line between the first end of the flying capacitor and the positive electrode of the power supply;
the second resistor is disposed on the connection line between the second end of the flying capacitor and the positive electrode of the power supply;
the third resistor is disposed on the connection line between the second end of the flying capacitor and the negative electrode of the power supply;
the fourth resistor is disposed on the connection line between the first end of the flying capacitor and the negative electrode of the power supply;
the first single-pole single-throw relay is disposed on a connection line between the first resistor and the positive electrode of the power supply;

the second single-pole single-throw relay is disposed on a connection line between the second resistor and the positive electrode of the power supply;

the third single-pole single-throw relay is disposed on a connection line between the third resistor and the negative electrode of the power supply; and wherein the fourth single-pole single-throw relay is disposed on a connection line between the fourth resistor and the negative electrode of the power supply.

7. The method according to claim 6, wherein the controller is electrically connected to the first end of the flying capacitor and the second end of the flying capacitor separately; and the controller is further configured to:

when detecting that a voltage of the flying capacitor is a preset value, control the first, second, third, and fourth single-pole single-throw relays to be open.

8. The method according to claim 6, wherein after controlling the first, second, third, and fourth single-pole single-throw relays to be open, the controller is further configured to:

control the main topology to output at least one level state.

9. The method according to claim 6, wherein the first, second, third, and fourth single-pole single-throw relays are metal-oxide-semiconductor field-effect transistors (MOS transistors) or triodes.

10. A method of operating a multi-level inverter comprising:

controlling a first, second, third, and fourth single-pole single-throw relays to be closed before a main topology works, using a controller; and controlling the first, second, third, and fourth single-pole single-throw relays to be open when detecting that charging a flying capacitor is completed; wherein the multi-level inverter includes:

the main topology comprising a power supply, the flying capacitor, and at least four semiconductor switches including a first semiconductor switch, a second semiconductor switch, a third semiconductor switch, and a fourth semiconductor switch;

four resistors including a first resistor, a second resistor, a third resistor, and a fourth resistor;

the four single-pole single-throw relays including the first single-pole single-throw relay, the second single-pole single-throw relay, the third single-pole single-throw relay, and the fourth single-pole single-throw relay; and the controller, wherein a first end of the flying capacitor is electrically connected to a positive electrode of the power supply, a second end of the flying capacitor is electrically connected to a negative electrode of the power supply, the controller is electrically connected to the first, second, third and fourth single-pole single-throw relays and the main topology, the flying capacitor is connected to the second and third semiconductor switches in parallel, the first semiconductor switch is disposed on a first connection line between the first end of the flying capacitor and the positive electrode of the power supply, and the fourth semiconductor switch is disposed on a first connection line between the second end of the flying capacitor and the negative electrode of the power supply;

the first single-pole single-throw relay and the first resistor are disposed on a connection line between the first end of the flying capacitor and the positive electrode of the power supply;

the second single-pole single-throw relay and the second resistor are disposed on a connection line between the second end of the flying capacitor and the positive electrode of the power supply;

the third single-pole single-throw relay and the third resistor are disposed on a connection line between the second end of the flying capacitor and the negative electrode of the power supply;

the fourth single-pole single-throw relay and the fourth resistor are disposed on a connection line between the first end of the flying capacitor and the negative electrode of the power supply;

the first resistor is disposed on the connection line between the first end of the flying capacitor and the positive electrode of the power supply;

the second resistor is disposed on the connection line between the second end of the flying capacitor and the positive electrode of the power supply;

the third resistor is disposed on the connection line between the second end of the flying capacitor and the negative electrode of the power supply;

the fourth resistor is disposed on the connection line between the first end of the flying capacitor and the negative electrode of the power supply;

the first single-pole single-throw relay is disposed on a connection line between the first resistor and the first end of the flying capacitor;

the second single-pole single-throw relay is disposed on a connection line between the second resistor and the second end of the flying capacitor;

the third single-pole single-throw relay is disposed on a connection line between the third resistor and the second end of the flying capacitor; and wherein the fourth single-pole single-throw relay is disposed on a connection line between the fourth resistor and the first end of the flying capacitor.

* * * * *